US012172172B2

(12) United States Patent
Tigges et al.

(10) Patent No.: US 12,172,172 B2
(45) Date of Patent: Dec. 24, 2024

(54) WEAR-RESISTANT ELEMENT FOR A COMMINUTING APPARATUS

(71) Applicant: FLSmidth A/S, Valby (DK)

(72) Inventors: Marc Tigges, Ahlen (DE); Baris Irmak, Beckum (DE)

(73) Assignee: FLSmidth A/S (DK)

( * ) Notice: Subject to any disclaimer, the term of this patent is extended or adjusted under 35 U.S.C. 154(b) by 154 days.

(21) Appl. No.: 17/780,152

(22) PCT Filed: Nov. 25, 2020

(86) PCT No.: PCT/EP2020/083409
§ 371 (c)(1),
(2) Date: May 26, 2022

(87) PCT Pub. No.: WO2021/105237
PCT Pub. Date: Jun. 3, 2021

(65) Prior Publication Data

US 2022/0410168 A1 Dec. 29, 2022

(30) Foreign Application Priority Data

Nov. 26, 2019 (BE) .................................. 2019/5840
Nov. 26, 2019 (DE) ..................... 10 2019 218 219.4

(51) Int. Cl.
*B02C 4/30* (2006.01)

(52) U.S. Cl.
CPC .......... *B02C 4/305* (2013.01); *B02C 2210/02* (2013.01)

(58) Field of Classification Search
CPC ............................ B02C 4/305; B02C 2210/02
See application file for complete search history.

(56) References Cited

U.S. PATENT DOCUMENTS 4,848,683 A * 7/1989 Kawatsu ................. B02C 2/005 241/300
5,269,477 A * 12/1993 Buchholtz ............... B02C 4/305 241/293
(Continued)

FOREIGN PATENT DOCUMENTS

DE 10 2006 010 042 A1 9/2007
DE 102013106738 A1 * 12/2014 ............. B02C 4/305
(Continued)

OTHER PUBLICATIONS

English Translation of International Search Report issued in PCT/EP2020/083409, dated Feb. 3, 2021.

*Primary Examiner* — Faye Francis
(74) *Attorney, Agent, or Firm* — Jeffrey A. Sharp

(57) ABSTRACT

A comminuting device (10) has a wear-resistant element (16) for partial insertion into a recess (26) in the surface of a wear area (12, 14). The wear-resistant element (16) has a fastening region (24), which can be connected to the recess (26) in the surface of the wear area (12, 14), and a wear region (22), which protrudes at least partially from the surface of the wear area (12, 14). The fastening region (24) is formed from a metal, the wear region (22) has a shell (18) and a core (20) arranged inside the shell (18). The core (20) is formed from a metal and the shell (18) is formed from a ceramic (20). The material of the shell comprises a ceramic which contains yttrium-stabilized, tetragonal polycrystalline zirconium oxide (TPZ). The TPZ has a proportion of the ceramic by volume of at least 60%, preferably at least 80%, in particular 95% to 100%.

20 Claims, 3 Drawing Sheets

(56) References Cited

U.S. PATENT DOCUMENTS

| | | | | |
|---|---|---|---|---|
| 7,510,135 | B2 * | 3/2009 | Burchardt | B02C 4/305 241/300 |
| 8,517,295 | B2 * | 8/2013 | Matsuzaki | B02C 4/305 241/189.1 |
| 9,492,827 | B2 * | 11/2016 | Daniels | B02C 4/02 |
| 10,155,226 | B2 * | 12/2018 | Frangenberg | B02C 4/305 |
| 10,654,043 | B2 * | 5/2020 | Irmak | B02C 4/305 |
| 2008/0210798 | A1 * | 9/2008 | Hall | E21C 35/18 241/294 |
| 2009/0218429 | A1 | 9/2009 | Hagedorn et al. | |
| 2011/0008569 | A1 * | 1/2011 | Madok | B32B 3/14 428/411.1 |
| 2012/0312907 | A1 * | 12/2012 | Gronvall | B02C 4/30 241/293 |
| 2013/0284840 | A1 * | 10/2013 | Packeisen | B30B 3/005 29/895.21 |
| 2013/0299618 | A1 * | 11/2013 | Sharman | B02C 23/00 241/300 |
| 2014/0183291 | A1 * | 7/2014 | Frangenberg | B02C 4/30 241/294 |

FOREIGN PATENT DOCUMENTS

| | | | | |
|---|---|---|---|---|
| EP | 699479 | A1 * | 3/1996 | B02C 4/305 |
| EP | 830897 | A1 * | 3/1998 | B02C 4/305 |
| EP | 2 512 680 | A | 10/2012 | |
| EP | 3 088 084 | A1 | 11/2016 | |
| WO | WO-2011048226 | A1 * | 4/2011 | B02C 4/305 |
| WO | 2011/072754 | A1 | 6/2011 | |
| WO | 2016/008967 | A1 | 1/2016 | |
| WO | 2017/125309 | A1 | 7/2017 | |

* cited by examiner

WEAR-RESISTANT ELEMENT FOR A COMMINUTING APPARATUS

CROSS REFERENCE TO RELATED APPLICATIONS

This application is a U.S. National Stage Entry of International Patent Application Serial Number PCT/EP2020/083409, filed Nov. 25, 2020, which claims priority to German Patent Application No. DE 10 2019 218 219.4, filed Nov. 26, 2019, and Belgian Patent Application No. BE 2019/5840, filed Nov. 26, 2019, the entire contents of all of which are incorporated herein by reference.

FIELD

The present disclosure generally relates to comminuting, including a wear-resistant element for partial insertion into a recess in a surface of a wear area of a comminuting device and including comminuting devices having such wear-resistant elements.

BACKGROUND

In comminuting devices, such as grinding rollers, which are used in particular in material-bed comminution of for example hard ore, a high degree of wear of the surface of a wear area, such as for example the grinding roller surface, occurs during operation of the comminuting device. In order to counteract this wear, it is known, for example from DE 2006 010 042 A1, to apply additional wear-resistant elements to the surface of the grinding roller. Given a certain degree of wear, it is necessary to replace or renovate the wear-resistant elements of the grinding roller, for example, in order to guarantee efficient grinding. The replacement of a worn wear-resistant element is problematic in particular in the case of ceramic wear-resistant elements. Usually, when a wear-resistant element is damaged, the connection between the base body and the wear-resistant element, such as for example adhesive, is destroyed by heating and is expelled from or drawn out of the cutout in the base body, for example a roller body, by the gases produced during the heating. However, in the case of a ceramic material, the gases escape through cracks in the material. Mechanical removal of the ceramic wear-resistant element is also complex because it is not possible to solder on a metal in order for the wear protection element to be drawn out, for example. The replacement of the wear-resistant elements therefore frequently entails long downtimes of the roller mill and high maintenance costs.

Thus a need exists to provide a wear-resistant element that has a high wear resistance, in order to increase the maintenance intervals for replacing the wear-resistant elements, wherein the wear-resistant element can be replaced cost-effectively at the same time.

DETAILED DESCRIPTION

Figure 1:
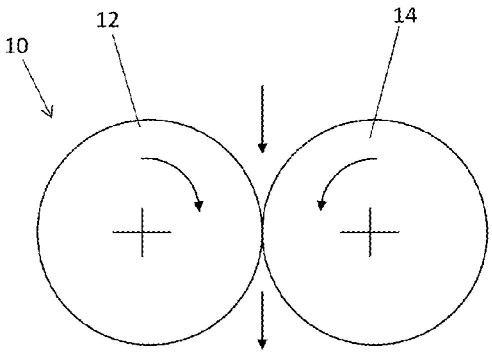
FIG. 1 is a schematic front view of an example comminuting device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, the present invention comprises a wear-resistant element for partial insertion into a recess in the surface of a wear area of a comminuting device, wherein the wear-resistant element has a fastening region, which can be connected to the recess in the surface of the wear area, and a wear region, which protrudes at least partially from the surface of the wear area. The fastening region is formed from a metal. The wear region has a shell and a core arranged at least partially inside the shell, wherein the core is formed from a metal and the shell is formed from a ceramic. In particular, the core is arranged completely inside the shell. The material of the shell comprises a ceramic which contains yttrium-stabilized, tetragonal polycrystalline zirconium oxide (TPZ), wherein the TPZ comprises a proportion of the ceramic by volume of at least 60%, preferably at least 80%, in particular 95% to 100%.

The comminuting device is for example a roller mill, a roller crusher, a hammer mill or a vertical roller mill, wherein the wear area is in particular the surface, exposed to a high degree of wear during operation of the comminuting device, of a grinding roller, the hammer tools and the surface of the grinding track of a hammer mill, or the surface of the rollers and of the grinding table of a vertical roller mill.

The wear-resistant element has for example a cylindrical form or a square cross section. In particular, one end of the wear-resistant element is formed in such a way that it can be fastened to the surface of the wear area, in particular in a recess in the surface of the wear area.

The fastening region is preferably arranged in such a way that, during operation of the comminuting device, it is exposed to no wear or only very little wear. In particular, the fastening region serves for fastening the wear-resistant element to the surface of the wear area. The wear region is arranged on the fastening region and preferably extends level with the wear-resistant element beyond the fastening region, with the result that the wear region is exposed to most of the wear acting on the wear-resistant element. The wear region is preferably attached completely outside the surface of the wear area, wherein exclusively the fastening region is arranged in the recess in the wear area. The fastening region and the core of the wear region are, for example, formed completely from a metal, such as for example steel, or hard metal, such as for example tungsten carbide. The shell is preferably formed completely from a ceramic.

The core has a cylindrical form, for example, and extends in particular from the fastening region through the entire wear region. It is likewise conceivable that the core has a square or polygonal cross section. The core preferably extends through the wear region in the axial direction along the center axis of the wear-resistant element. It is likewise conceivable that the core extends along an outer area of the wear element in the axial direction.

Such a wear-resistant element can be produced much more cost-effectively, because it is possible to dispense with forming the entire wear-resistant element from the more expensive, more wear-resistant material, such as ceramic. The region of the wear-resistant element which is exposed to no wear or only to very little wear comprises a less wear-resistant material, resulting in lower material costs. A core of metal in the wear region offers the advantage that the worn wear-resistant element can be removed thereon from the cutout in the surface of the grinding roller. For the purpose of removing the wear-resistant element, it is heated, for example, in order to release a connection between the fastening region and the wear area of the comminuting device. The wear-resistant element is then drawn out on the metal core. In the event of severe wear, it is likewise conceivable to fasten a metallic material to the metal core by soldering, for example, and to draw the wear-resistant element out thereon from the cutout in the wear area.

According to a first embodiment, the core extends through the entire wear region. This makes it possible to remove the wear-resistant element in a simple manner, regardless of the severity of the wear.

According to a further embodiment, the core is fixedly connected to or formed in one piece with the fastening region. The fastening region with the core is produced by casting or machining, such as turning or milling, for example. This ensures that the fastening region is removed together with the wear region. The core is for example bonded substance-to-substance, in particular soldered, adhesively bonded or welded, to the fastening region.

According to a further embodiment, the shell has a sleeve-shaped form. "Sleeve-shaped" is to be understood in particular to mean that the shell has a cylindrical form with a central cutout, the core being arranged within the cutout. The fastening region preferably has a cylindrical form and the wear region lies against it.

By way of example, the material of the shell comprises a ceramic material, such as for example tungsten carbide WC, titanium carbide TiC, titanium carbonitride TiCN, vanadium carbide VC, chromium carbide CrC, tantalum carbide TaC, boron carbide BC, niobium carbide NbC, molybdenum carbide Mo2C, aluminum oxide Al2O3, zirconium oxide ZrO2, and/or silicon carbide SiC, or a combination of the stated materials. Furthermore, preferably particles of industrial diamonds, in particular high-strength ceramics, are embedded in a ceramic or metallic matrix in the wear region.

The material of the shell comprises a ceramic which contains yttrium-stabilized, tetragonal polycrystalline zirconium oxide (TPZ), wherein the TPZ comprises a proportion of the ceramic by volume of at least 60%, preferably at least 80%, in particular 95% to 100%. This has the advantage that the material has increased corrosion resistance, in particular in the case of wet grinding.

In particular, the ceramic has a porosity of less than 5%, preferably less than 4%, in particular less than 3%. The ceramic preferably has a porosity of at least 1%.

A porosity of less than 5%, preferably less than 4%, in particular less than 3%, results in improved wear behavior. The aforementioned porosity specification is preferably the total porosity, which corresponds to a mean average of the pore sizes of the material. The pores are preferably distributed substantially uniformly over the ceramic material.

By way of example, the ceramic has a density from 1.5 to 5 g/cm$^3$, preferably 2 to 4 g/cm$^3$, in particular 2.7 to 3 g/cm$^3$. The ceramic comprises an Al2O3 (corundum) proportion of 10%, for example. This results in improved wear resistance combined with a slight reduction in the toughness of the ceramic.

In particular, the ceramic has a ratio of monoclinic to tetragonal zirconium oxide of less than 40%, in particular less than 30%, preferably less than 20%. The ratio of monoclinic to tetragonal zirconium oxide is preferably at least 2%. By way of example, the zirconium oxide incorporated in the ceramic comprises less than 40%, in particular less than 30%, preferably less than 20% monoclinic zirconium oxide, the remaining zirconium oxide being tetragonal zirconium oxide. The ratio of monoclinic to tetragonal zirconium oxide is determined by X-ray diffraction in accordance with ISO 13356, for example. At a ratio of more than 40%, preferably more than 30%, in particular more than 20% monoclinic to tetragonal and/or cubic zirconium oxide, negative effects occur, such as for example metastable zirconium oxide being converted to the stable monoclinic phase too quickly, with an increase in volume. If the conversion is too quick, surface tensions arise which generate local cracks, for example.

In particular, the yttrium-stabilized zirconium oxide of the ceramic has a grain size D50 of less than 1.5 μm, preferably less than 1 μm, in particular less than 0.8 μm. The D50 grain size of the ceramic is preferably at least 0.2 μm. The D50 value is to be understood to mean the grain size of 50% of the grains of the ceramic. In the case of the exemplary D50 grain size value, 50% of the grains of the yttrium-stabilized zirconium oxide have a grain size diameter of less than 1.5 μm, preferably less than 1 μm, in particular less than 0.8 μm.

The D90 value of the grain size is preferably less than 3 μm, in particular less than 2 μm, preferably less than 1.5 μm. Wear-resistant elements of a comminuting device are exposed to local loading. A broad grain size distribution should therefore be avoided in order to prevent the formation of cracks or breakouts.

In particular, the ceramic has an yttrium content of 2 to 4 mol % Y2O3. Advantages of such an yttrium content are better sintering behavior at an even lower sintering temperature, as well as a finer crystalline structure which in turn results in higher fatigue resistance and improved fracture toughness. Furthermore, the ceramic comprises Ce-TZP with a CeO2 content of 10 to 12 mol %, for example. In particular, the ceramic has an Mg—PSZ content of 8 to 10 mol %. It is likewise conceivable that the ceramic has an MgO content of 5 to 10 mol % as stabilizer.

In particular, the number of pores in the ceramic that have a size of more than 200 μm is less than 0.1 per mm$^2$. The number of pores per area likewise provides an indication of the wear resistance. A small number of pores of relatively large size, such as more than 200 μm, ensures high wear resistance, because instances of local breakout from the ceramic material are avoided.

The number of pores in the ceramic that have a size of more than 150 μm is preferably less than 0.4 per mm$^2$. In particular, the number of pores in the ceramic that have a size of more than 100 μm is less than 2 per mm$^2$. Such a number of pores considerably increases the service life of the wear-resistant element.

According to a further embodiment, the material of the fastening region comprises a steel, such as for example a quenched and tempered structural steel. According to a further embodiment, the shell is fixedly connected, for example by a substance-to-substance bond, such as adhesive bonding or soldering, or by a form fit, to the fastening region.

According to a further embodiment, the fastening region comprises less than 50%, preferably less than 20%, most preferably less than 15% of the wear-resistant element. The fastening region comprises at least 10% of the wear-resistant element, for example.

The invention furthermore comprises a comminuting device having a wear area and a wear-resistant element as described above, wherein the wear-resistant element is attached at least partially in a recess in the surface of the wear area, in particular of a grinding roller.

The advantages described with regard to the wear-resistant element also apply to the comminuting device having such a wear-resistant element.

According to a further embodiment, the fastening region of the wear-resistant element is bonded substance-to-substance, in particular welded, adhesively bonded or soldered, to the grinding roller. The fastening region is preferably soldered, adhesively bonded or welded to the recess in the wear surface.

The comminuting device is for example a grinding roller for material-bed comminution or a vertical roller mill.

FIG. 1 schematically illustrates a comminuting device 10, in particular a roller mill. The comminuting device 10 comprises two grinding rollers, illustrated schematically as circles, having wear areas 12, 14 which have the same diameter and are arranged alongside one another. Formed between the wear areas 12, 14 of the grinding rollers is a grinding gap, the size of which can be set, for example.

During operation of the comminuting device 10, the grinding rollers rotate in opposite directions to one another in directions of rotation illustrated by the arrows, wherein grinding stock passes through the grinding gap in the falling direction and is ground.

Figure 2:
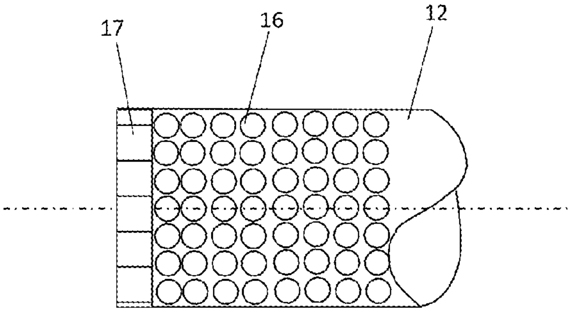
FIG. 2 is a schematic view of a grinding roller of the comminuting device according to FIG. 1.

FIG. 2 shows an end region of a grinding roller which has a wear area 12, to which wear-resistant elements 16 are attached. The wear-resistant elements 16 are attached in the outer circumference of the surface of the grinding roller. For example, the mutually spaced-apart wear-resistant elements 16, arranged alongside one another, in FIG. 2 have a circular cross section.

It is likewise conceivable for the wear-resistant elements 16 to vary in terms of size, number, cross-sectional shape and arrangement with respect to one another over the surface of the grinding roller, in order for example to compensate for local differences in wearing during operation of the comminuting device 10.

Furthermore, the grinding roller has wear-resistant corner elements 17, attached to its end, which have for example a rectangular cross section and are arranged in a row alongside one another such that they form a ring around the circumference of the grinding roller. Further cross-sectional shapes of the wear-resistant corner elements 17, which differ from the cross-sectional shape shown in FIG. 2, are furthermore conceivable. A mutually spaced-apart arrangement of the wear-resistant corner element 17 is also possible. In FIG. 2, by way of example, only the left-hand end of the grinding roller having the wear area 12 is shown, with the right-hand end, which is not shown, advantageously having an identical construction.

Figure 3:
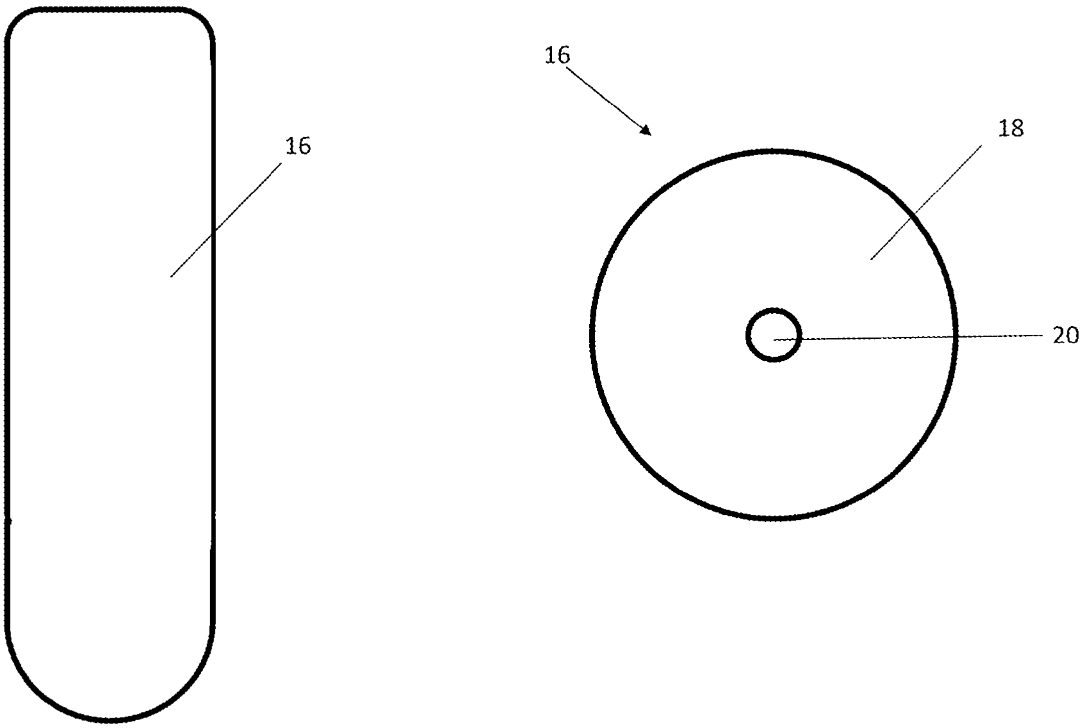
FIG. 3 is a schematic, side, plan view of an exemplary embodiment of a wear-resistant element.

FIG. 3 shows a wear-resistant element 16 in a side view and a plan view. The wear-resistant element 16 has a shell 18 and a core 20, which is at least partially radially surrounded by the shell. The core 20 extends axially along the center axis of the substantially cylindrical wear-resistant element 16 to the upper end face of the wear-resistant element 16. The core 20 for example has a cylindrical form and is preferably fixedly connected to the shell 18. It is likewise conceivable that a plurality of cores 20, for example two, four or six cores 20, extend through the wear-resistant element 16, preferably parallel to one another. By way of example, the diameter of the core 20 is approximately 10 to 30% of the diameter of the wear-resistant element 16.

Figure 4:
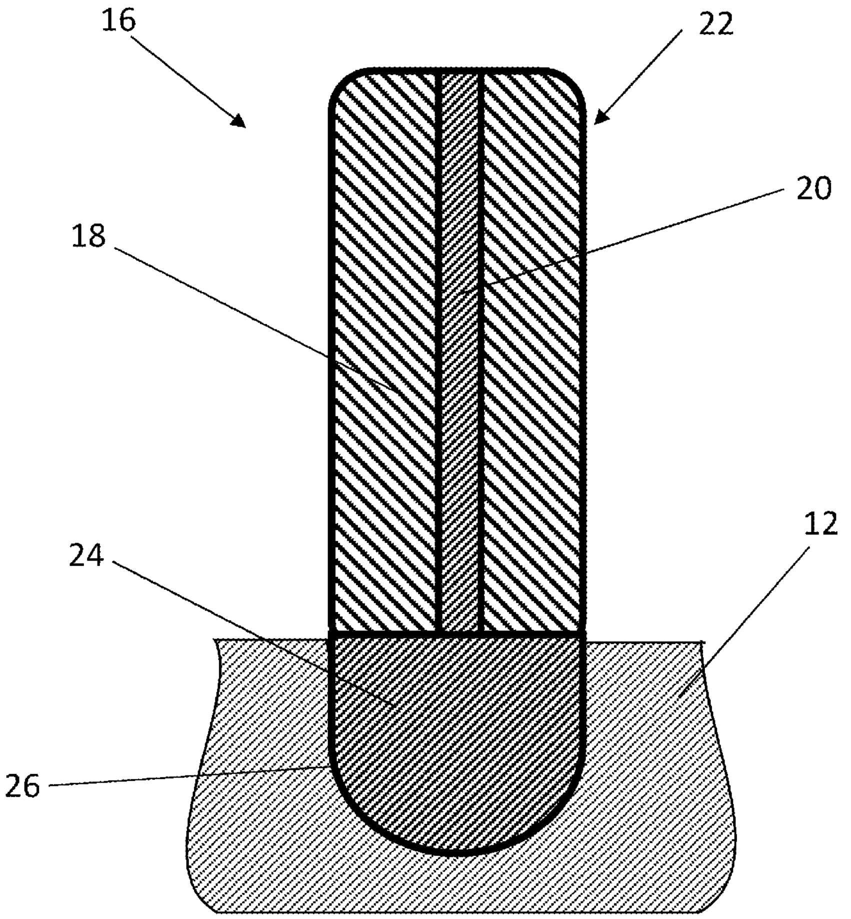
FIG. 4 is a schematic, sectional view of an exemplary embodiment of an wear-resistant element.

FIG. 4 shows a sectional view of the wear-resistant element 16 in FIG. 3. The wear-resistant element 16 has a fastening region 24 and a wear region 22, wherein the fastening region 24 is arranged in the recess 26 in the surface of the wear area 12 of the grinding roller and is connected to the wear area 12 of the grinding roller. For example, on the fastening region 24, the wear-resistant element 16 is bonded substance-to-substance, in particular welded, soldered or adhesively bonded, or connected by a form fit, in particular screwed or wedged, to the recess 26 in the surface of the wear area 12 of the grinding roller. The wear region 22 of the wear-resistant element 16 is arranged at least partially or completely outside the recess 26 in the wear area 12, with the result that said wear region protrudes from the surface of the wear area 12 in a radial direction of the grinding roller (not illustrated). In the exemplary embodiment illustrated, the fastening region 24 comprises about one third of the entire wear-resistant element 16, the wear region 22 comprising approximately the further two thirds. The fastening region 24 is preferably formed from a metal, such as for example steel.

The wear region 22 of the wear-resistant element 16 comprises the shell 18 and the core 20, the shell 18 preferably being formed from a ceramic material, such as for example tungsten carbide, titanium carbide, titanium carbonitride, vanadium carbide, chromium carbide, tantalum carbide, boron carbide, niobium carbide, molybdenum carbide, aluminum oxide, zirconium oxide, and/or silicon carbide, or a combination of the stated materials. In particular, the ceramic of the shell comprises yttrium-stabilized, tetragonal polycrystalline zirconium oxide (TPZ), wherein the TPZ comprises a proportion of the ceramic by volume of at least 60%, preferably at least 80%, in particular 95% to 100%.

Furthermore, it is also possible for particles of industrial diamonds or high-strength ceramics to be embedded in a ceramic or metallic matrix in the shell 18. The shell 18 comprises a matrix material, for example, in which a plurality of particles are arranged. The particles in question are in particular a highly wear-resistant material which comprises for example diamond, ceramic or titanium. The matrix material comprises for example tungsten carbide. The particles are bonded to the matrix material in particular substance-to-substance, for example by sintering.

During operation of the comminuting device 10, the wear-resistant elements 16 are exposed to a high degree of wear, wherein in particular the wear region 22, protruding from the surface of the wear areas 12, 14 of the grinding rollers, of the wear-resistant elements 16 becomes worn. The wear-resistant material of the wear region 22 considerably reduces the wear of the wear-resistant elements 16. Furthermore, formation of the fastening region, which is exposed to no wear or only to very little wear, from the more expensive, more wear-resistant material is dispensed with. The metal core makes it possible to remove the wear-resistant element from the recess 26 in the roller surface, even if the wear region 22 is already severely worn, by using a suitable tool to draw the wear-resistant element 16 out on the metal core 20.

The fastening region 24 is preferably formed completely from a metal and is fixedly connected to the core 20. By way of example, the fastening region 24 is adhesively bonded, soldered or welded to or is formed in one piece with the core 20.

LIST OF REFERENCE SIGNS

10 Comminuting device/roller mill
12 Wear area/grinding roller
14 Wear area/grinding roller
16 Wear-resistant element
17 Wear-resistant corner element
18 Shell
20 Core
22 Wear region
24 Fastening region
26 Recess

What is claimed is:

1. A wear-resistant element configured for partial insertion into a recess in a surface of a wear area of a comminuting device, wherein the wear-resistant element comprises:

a fastening region that is comprised of metal and is configured to be connected to the recess in the surface of the wear area; and a wear region that protrudes at least partially from the surface of the wear area, with the wear region including a shell and a core disposed inside the shell, wherein the core is comprised of metal and the shell is comprised of a ceramic that contains yttrium-stabilized, tetragonal polycrystalline zirconium oxide (TPZ), wherein the TPZ makes up at least 60% by volume of the ceramic in the shell.

2. The wear-resistant element of claim 1 wherein the TPZ makes up at least 80% by volume of the ceramic in the shell.

3. The wear-resistant element of claim 1 wherein the TPZ makes up at least 95% by volume of the ceramic in the shell.

4. The wear-resistant element of claim 1 wherein the TPZ makes up at least 100% by volume of the ceramic in the shell.

5. The wear-resistant element of claim 1 wherein the core extends through an entirety of the wear region.

6. The wear-resistant element of claim 1 wherein the core is fixedly connected to the fastening region.

7. The wear-resistant element of claim 1 wherein the core is integral with the fastening region such that the core and the fastening region are a one-piece construction.

8. The wear-resistant element of claim 1 wherein the shell is sleeve shaped.

9. The wear-resistant element of claim 1 wherein the fastening region comprises steel.

10. The wear-resistant element of claim 1 wherein the shell is fixedly connected to the fastening region.

11. The wear-resistant element of claim 1 wherein the fastening region makes up less than 50% of the wear-resistant element.

12. The wear-resistant element of claim 1 wherein the fastening region makes up less than 20% of the wear-resistant element.

13. The wear-resistant element of claim 1 wherein the fastening region makes up less than 15% of the wear-resistant element.

14. A comminuting device comprising:

a grinding roller;

a wear area with a surface that has a recess; and a wear-resistant element that is attached at least partially in the recess, wherein the wear-resistant element comprises:

a fastening region that is comprised of metal and is configured to be connected to the recess in the surface of the wear area, and a wear region that protrudes at least partially from the surface of the wear area, with the wear region including a shell and a core disposed inside the shell, wherein the core is comprised of metal and the shell is comprised of a ceramic that contains yttrium-stabilized, tetragonal polycrystalline zirconium oxide (TPZ), wherein the TPZ makes up at least 60% by volume of the ceramic in the shell.

15. The comminuting device of claim 14 wherein the fastening region is bonded substance-to-substance to the grinding roller.

16. The comminuting device of claim 14 wherein the fastening region is welded to the grinding roller.

17. The comminuting device of claim 14 wherein the fastening region is adhesively bonded to the grinding roller.

18. The comminuting device of claim 14 wherein the fastening region is soldered to the grinding roller.

19. The comminuting device of claim 14 wherein the core is integral with the fastening region such that the core and the fastening region are a one-piece construction.

20. The comminuting device of claim 14 wherein the shell is sleeve shaped.

* * * * *